US006994208B2

(12) United States Patent
Saeki (10) Patent No.: US 6,994,208 B2
(45) Date of Patent: Feb. 7, 2006

(54) CURVED CONVEYOR

(75) Inventor: Naoyuki Saeki, Yamatokohriyama (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 10/477,666

(22) PCT Filed: May 7, 2002

(86) PCT No.: PCT/JP02/04440

§ 371 (c)(1),
(2), (4) Date: Nov. 11, 2003

(87) PCT Pub. No.: WO02/092474

PCT Pub. Date: Nov. 21, 2002

(65) Prior Publication Data

US 2004/0129535 A1    Jul. 8, 2004

(30) Foreign Application Priority Data

May 11, 2001    (JP)    ............................. 2001-141520

(51) Int. Cl.
*B65G 15/02*    (2006.01)
(52) U.S. Cl. .................................................. 198/831
(58) Field of Classification Search ................ 198/831
See application file for complete search history.

(56) References Cited

U.S. PATENT DOCUMENTS

| 2,234,537 | A | * | 3/1941 | Blackburn | 198/831 |
| 4,485,913 | A | * | 12/1984 | Treiber | 198/790 |
| 5,839,570 | A | * | 11/1998 | Vertogen et al. | 198/831 |
| 5,984,084 | A | * | 11/1999 | Osaka et al. | 198/831 |
| 5,992,615 | A | * | 11/1999 | Muchalov | 198/831 |
| 6,050,395 | A | * | 4/2000 | Shannon et al. | 198/831 |
| 6,053,306 | A | * | 4/2000 | Osaka et al. | 198/831 |
| 6,085,895 | A | * | 7/2000 | Osaka et al. | 198/831 |
| 6,098,790 | A | * | 8/2000 | Warnecke | 198/831 |
| 6,105,755 | A | * | 8/2000 | Muchalov | 198/831 |

FOREIGN PATENT DOCUMENTS

| DE | 43 33 518 A1 | 4/1995 |
| JP | 54-72868 A1 | 6/1979 |
| JP | 61-166417 A1 | 7/1986 |
| JP | 04-361908 A1 | 12/1992 |
| JP | 06-227631 A1 | 8/1994 |
| JP | 11-58937 A1 | 3/1999 |
| JP | 2000-327117 A1 | 11/2000 |
| JP | 2001-220007 A1 | 8/2001 |

OTHER PUBLICATIONS

Patent Abstracts of Japan for JP2001-220007 published on Aug. 14, 2001.
Patent Abstracts of Japan for JP2000-327117 published on Nov. 28, 2000.

(Continued)

*Primary Examiner*—Richard Ridley
(74) *Attorney, Agent, or Firm*—Darby & Darby (57) ABSTRACT

An end roller of a curved conveyor has an pivot shaft and a plurality of short rollers rotatably mounted on the pivot shaft. A bearing with an outer race of a larger outer diameter than the outer diameter of the short roller is interposed between at least the adjacent short rollers located near an outer peripheral side of the belt. A bearing having an outer race of the same size outer diameter as the outer diameter of the short rollers may also applicable. Frictional noises from the end rollers during the rotation of the conveyor belt may be suppressed.

8 Claims, 12 Drawing Sheets

OTHER PUBLICATIONS

Patent Abstracts of Japan for JP11-59837 published on Mar. 2, 1999.

Patent Abstracts of Japan for JP06-227631 published on Aug. 16, 1994.

Patent Abstracts of Japan for JP04-361908 published on Dec. 15, 1992.

Patent Abstracts of Japan for JP61-166417 published on Jul. 28, 1986.

Patent Abstracts of U.S. Appl. No. 4,202,443 issued on May 13, 1980 for JP54-72868 published on Jun. 11, 1979.

Patent Abstracts of Japan for DE43 33 518 published on Apr. 6, 1995.

* cited by examiner

CURVED CONVEYOR

This application is a U.S. national phase application under 35 U.S.C. §371 of International Patent Application No. PCT/JP02/04440 filed May 7, 2002, published as WO 02/092,474 on Nov. 21, 2002, and claims the benefit of Japanese patent Application No. 2001-141520 filed May 11, 2001 both of which are incorporated herein.

FIELD OF THE INVENTION

The present invention relates to a curved conveyor.

PRIOR ART

A conventional curved conveyor, for example, includes a curved conveyor belt stretched between two end rollers arranged at a predetermined angle on a conveyor main body. Each of the end rollers has a metal pivot shaft attached to the conveyor body and a plurality of resin short rollers provided rotatably on the pivot shaft.

In the above conventional curved conveyor belt, when the conveyor belt is driven to rotate, the short rollers located inner side rotate with a slow speed, while those located outer side rotate with a high speed. As a result, the slide between the conveyor belt and the short rollers is suppressed. On the other hand, as the short rollers located outer side rotate at a high speed, harsh squeaking sliding noises are generated between the shorter rollers and the pivot shaft.

It is, therefore, an object of the present invention to provide a curved conveyor which is free from squeaking friction noises from the end rollers along with the rotation of the conveyor belt.

SUMMARY OF THE INVENTION

In the present invention, a curved conveyor has two end rollers disposed at a certain angle and a conveyor belt stretched between the two end rollers. Each of the end rollers has an pivot shaft and a plurality of short rollers rotatably mounted on the pivot shaft. A bearing with an outer lace of a larger outer diameter than the outer diameter of the short roller is interposed between at least the adjacent short rollers located near an outer peripheral side of the belt.

In the present invention, a bearing with an outer lace of the same outer diameter as the outer diameter of the short roller may be alternatively interposed therebetween, and there may be a small gap between the pivot shaft and the short rollers.

The pivot shaft may be made of steel and the short rollers may be of resin. The pivot shaft may be attached to a conveyor body of the conveyor.

The above and other objects and advantages of the present invention will be apparent from the following description read in conjunction with the accompanying drawings.

DETAILED DESCRIPTION OF THE INVENTION

Figure 1:
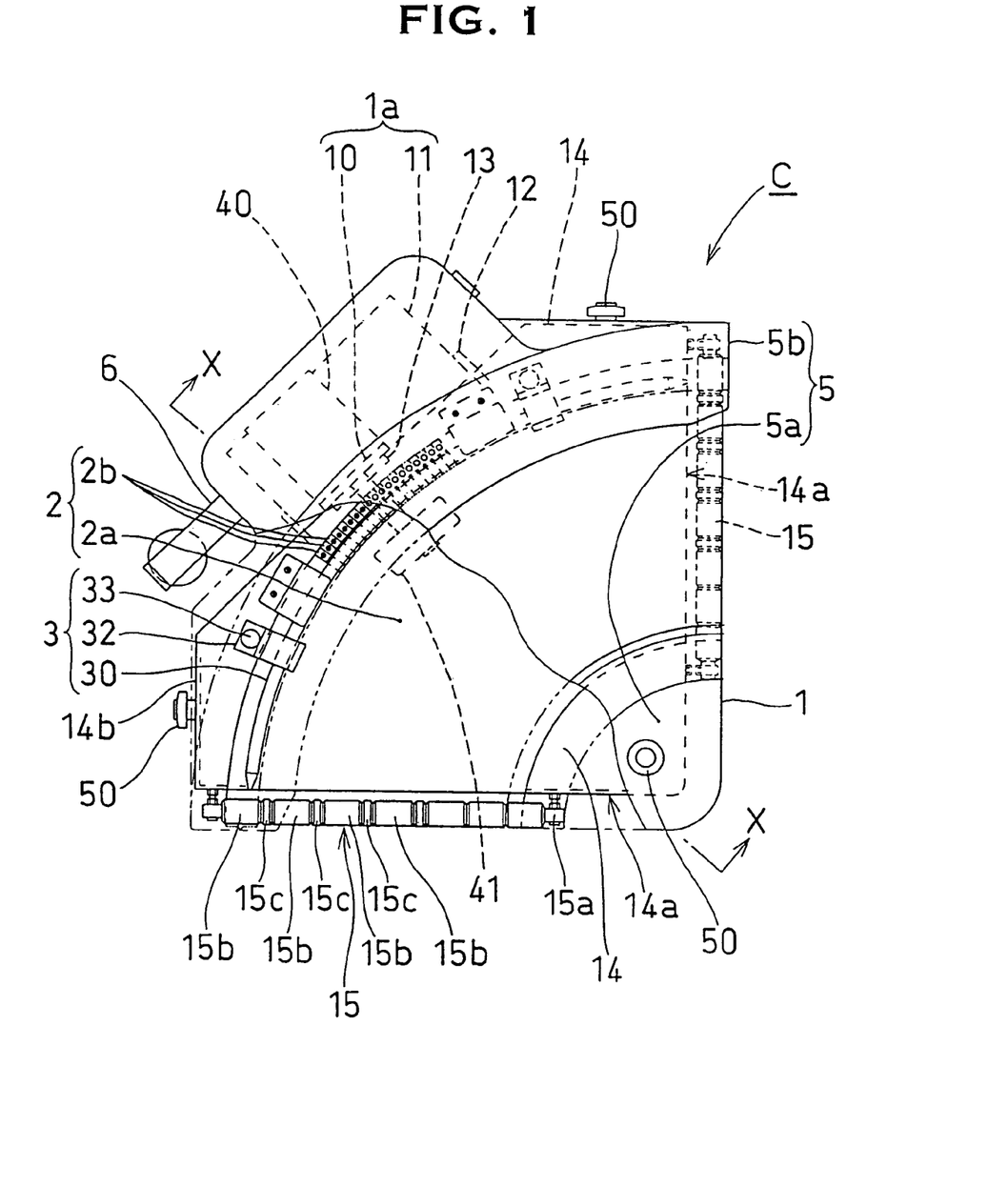
FIG. 1 is a plane view of a curved conveyor employing a conveyor belt with bead according to an embodiment of the present invention.
Figure 2:
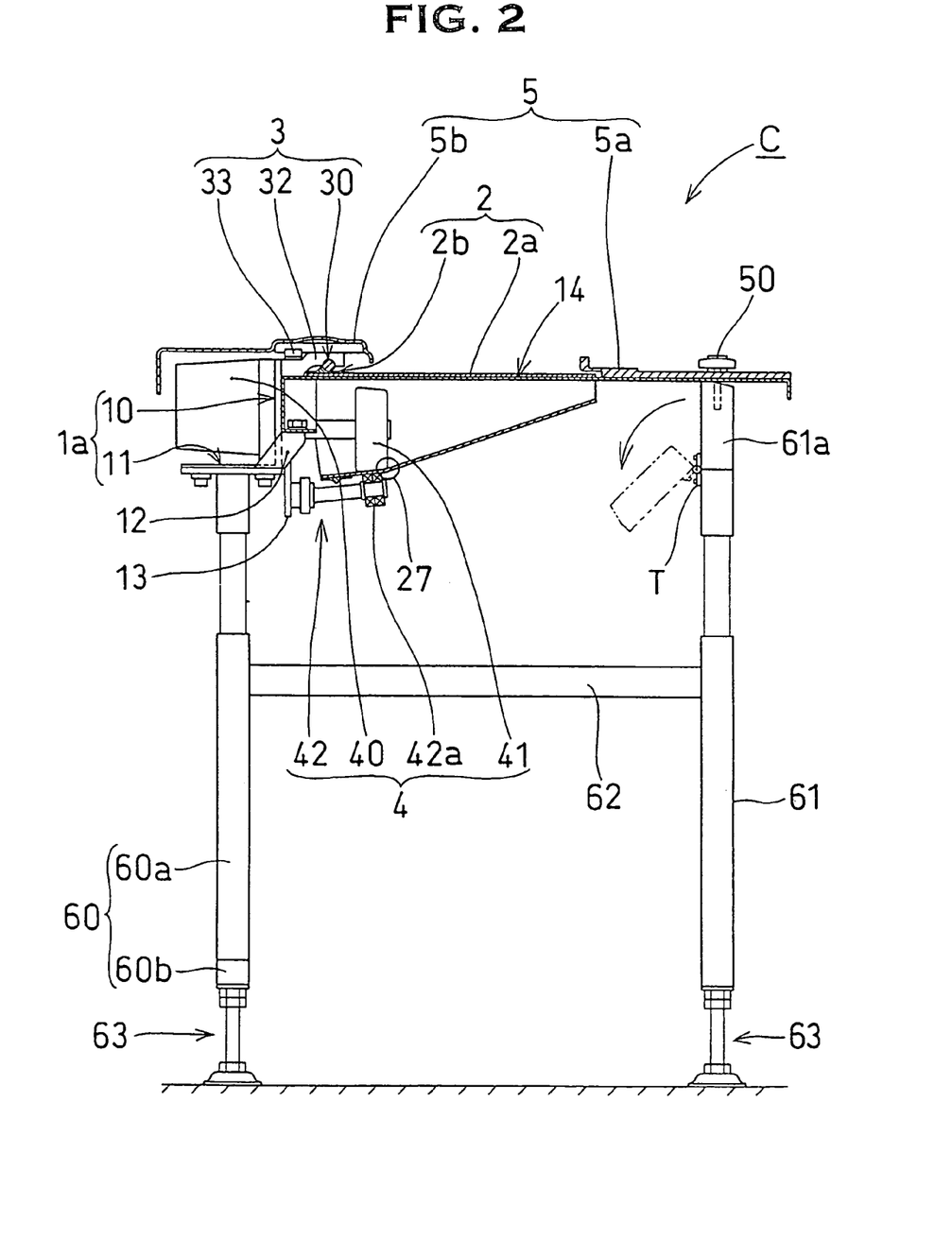
FIG. 2 is a sectional view taken along the line X—X of FIG. 1.

FIG. 1 shows a plane view of a conveyor C which employs end rollers 15 according to this invention. FIG. 2 is a sectional view of FIG. 1 taken along the line X—X, and FIG. 3 is a bottom view of the conveyor C.

Figure 3:
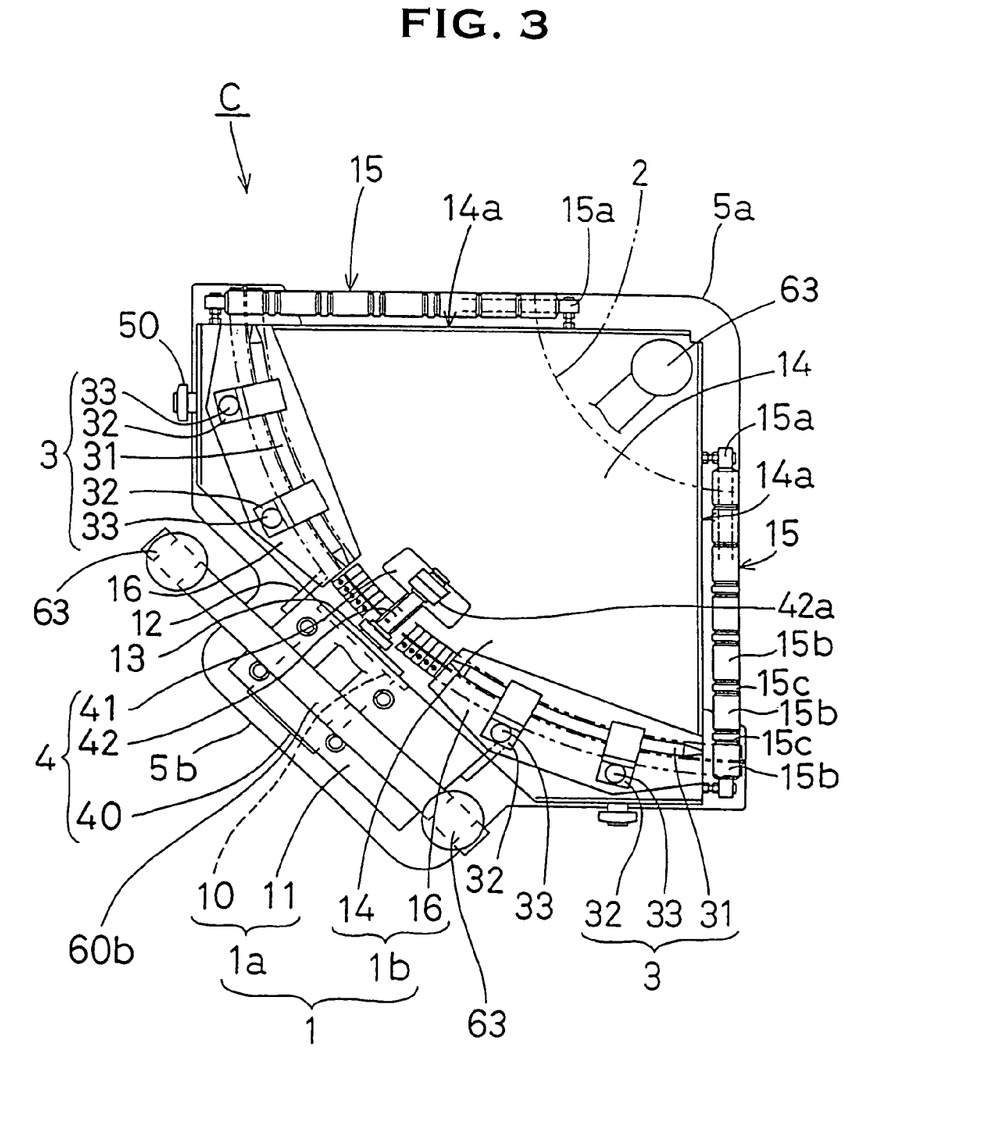
FIG. 3 is a bottom view of the curved conveyor.

A basic constitution of the curved conveyor C is shown in FIGS. 1 to 3. The curved conveyor C includes a conveyor main body 1, a conveyor belt 2 with bead stretched on the conveyor main body 1, a shift prevention member 3 for preventing the conveyor belt 2 with bead (the beaded conveyor belt 2) from shifting inwardly, a driving member 4 for rotationally driving the beaded conveyor belt 2. The conveyor C also includes a cover member 5 which covers a motor 40 with a decelerator for the driving member 4, the shift prevention member 3 on the upper side and an inner and an outer peripheral portion of the beaded conveyor belt 2, and a leg member 6 which keeps the conveyor main body 1 at a suitable height. These main parts of the curved conveyor C will be described in detail below.

The conveyor main body 1, as shown in FIG. 1, includes a motor support element 1a, and a belt support element 1b bolted to the motor support element 1a.

As shown in FIGS. 2 and 3, the motor support element 1a is composed of a motor mounting plate 10 and a base plate 11 provided on the upper end of the leg member 6, and formed in an L-shape in a side view. The base plate 11 has bracket portions 12 at both end portions thereof. The motor mounting plate 10 has a unit mounting plate 13 in the side of the belt support element 1b.

Figure 4:
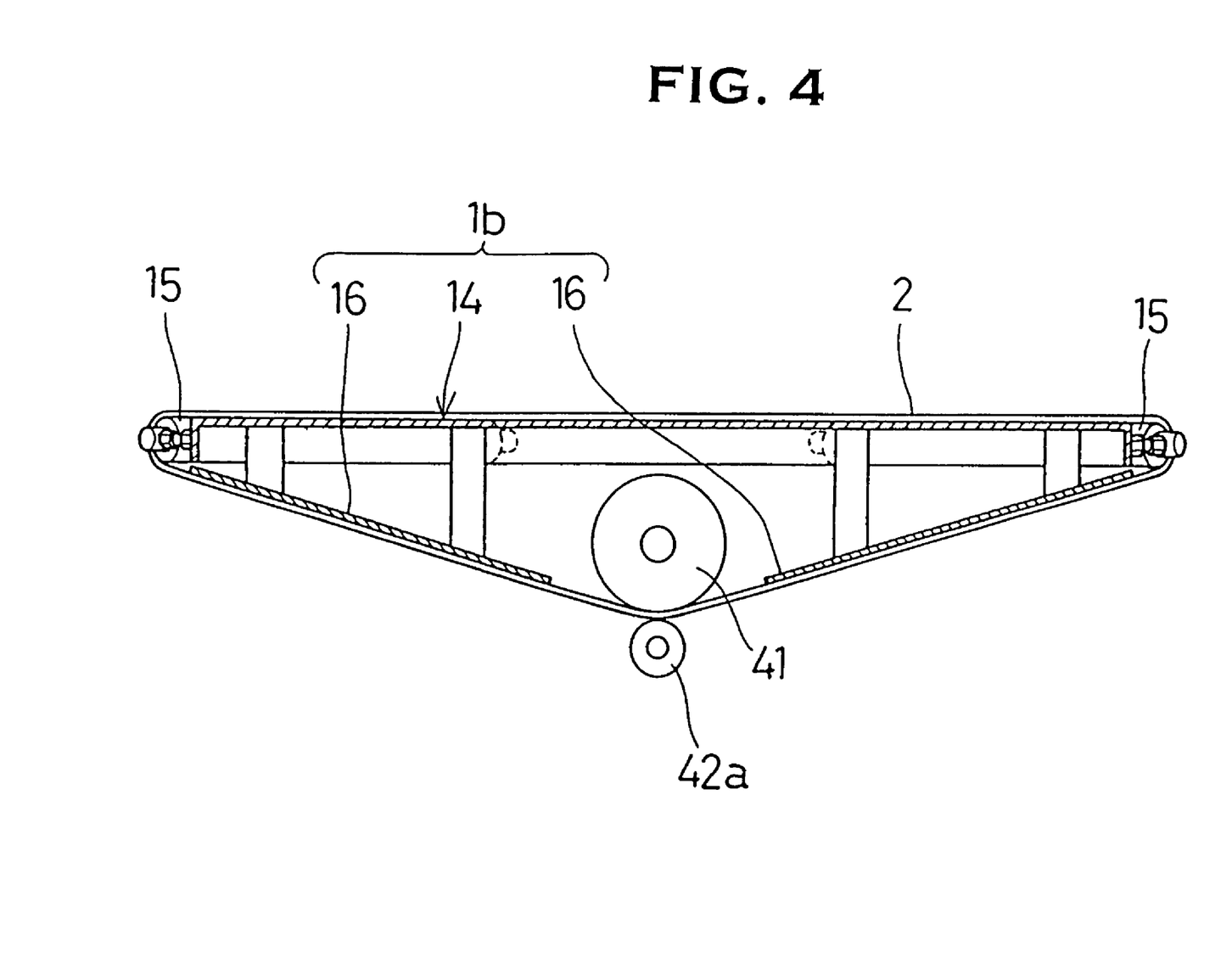
FIG. 4 is a view showing a state in which the conveyor belt with bead is stretched between the end rollers in the curved conveyor.

As shown in FIGS. 1, 3 and 4, the belt support element 1b includes a belt mounting plate 14 and two belt guide plates 16 and 16 which are fixed with a lower face of the belt mounting plate 14 through brackets. As shown in FIG. 2, the belt mounting plate 14 is bolted to the bracket portion 12. The belt mounting plate 14, as shown in FIG. 1, is formed in a pentagonal shape in a plane view. Bent pieces 14a and 14a provided at an angle of 90 degrees respectively receive straight end rollers 15 and 15 having a diameter of approximately 15 to 30 mm. As shown in FIGS. 1 and 3, the end roller 15 includes a stainless steel pivot shaft 15a bolted to the bent piece 14a and plural resin rollers 15b are attached rotatably on the pivot shaft 15a. A bearing or bearings 15c (the diameter of the outer lace is the same diameter as or a little larger diameter than the outer diameter of the short roller 15b) is/are interposed between the short rollers 15b and 15b provided near the outer peripheral side of the belt.

The bearing or bearings 15c may be interposed at least between the short rollers located near the outer peripheral side.

Figure 7:
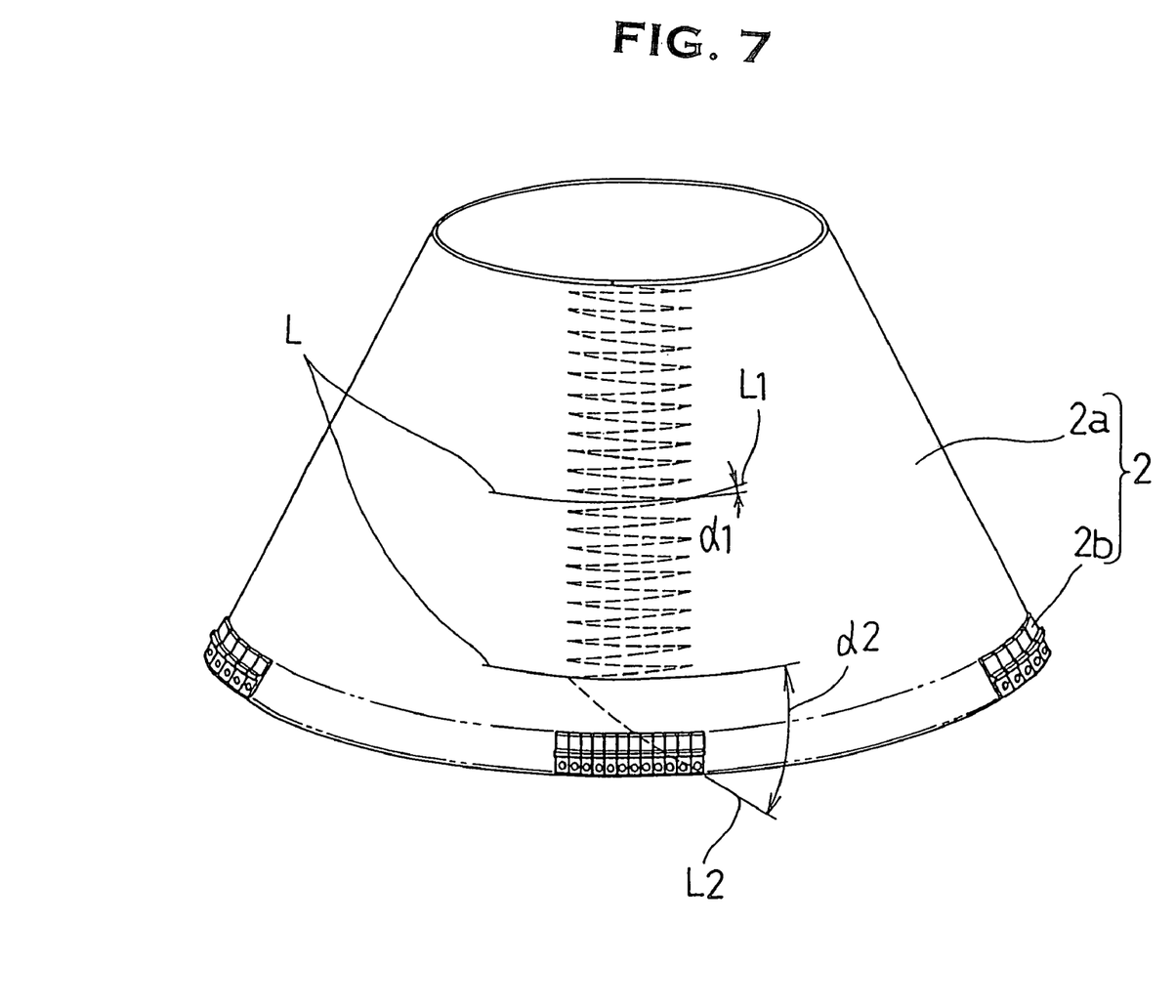
FIG. 7 is a perspective view of the conveyor belt with bead.

The conveyor belt 2 with bead is illustrated in FIGS. 1 and 7. It includes a belt body 2a and a number of bead composing elements disposed across an entire outer peripheral end of the belt body 2a. Each bead composing element has a narrow width.

Figure 6:
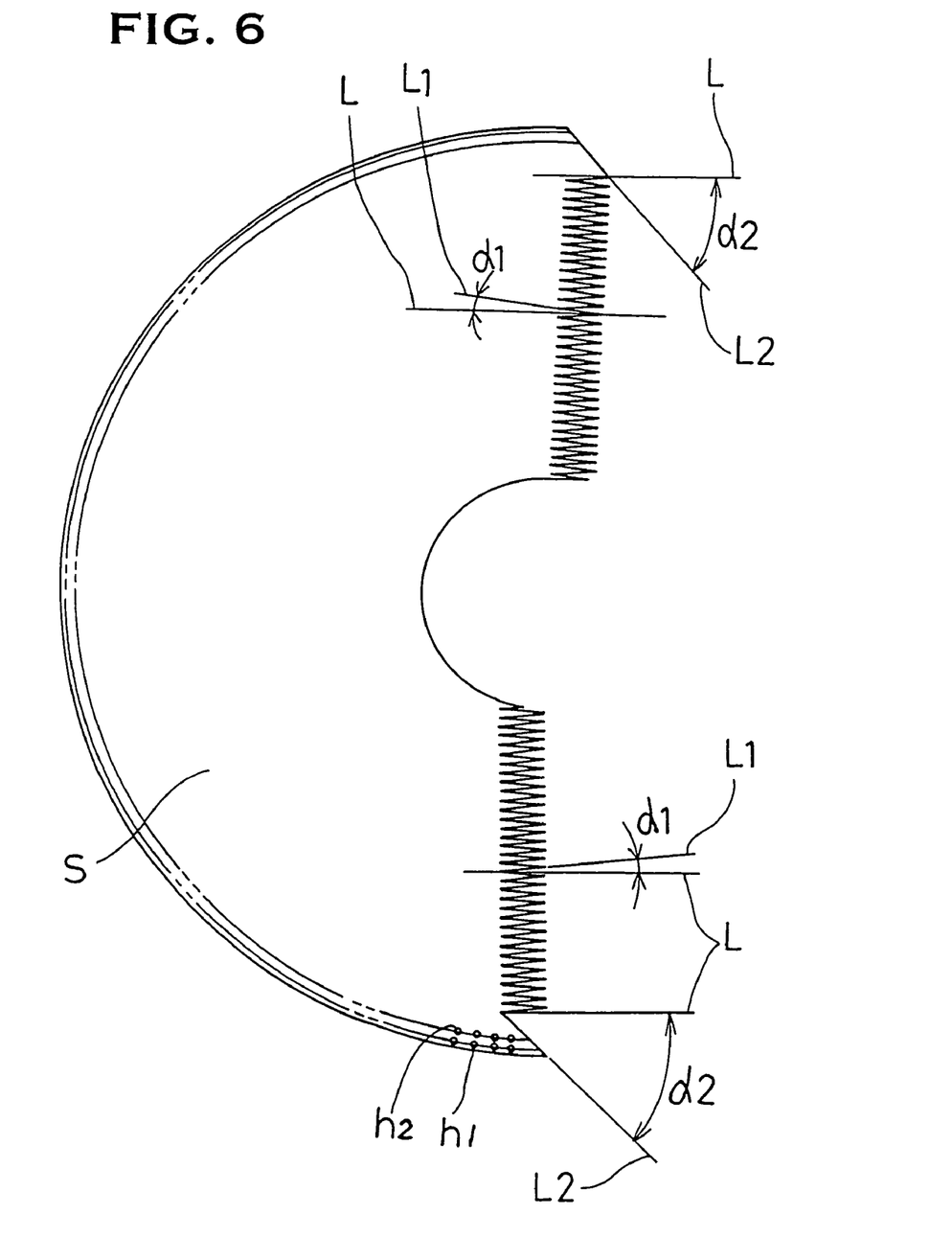
FIG. 6 is a plane view of a sheet for forming a belt body.

The belt body 2a has a polyester sail-cloth (canvas) as a core body thereof and a thermoplastic polyurethane as a surface material of a conveying face. Both ends of a fan-shaped belt forming sheet are joined to make a tapered tube shape as shown in FIG. 7. The belt body of this type is generally formed by joining end portions of a fan-shaped material together with a skiving joint or a step joint 2a. However, such joints cause problems such as raising manufacturing cost, increasing the number of manufacturing steps, thickening a joined part, and the like. Therefore, in the embodiment, the belt is manufactured in the following manners (1) and (2):

(1) As shown in FIG. 6, a sheet S which has a polyester canvas as a core body and a thermoplastic polyurethane as a surface material of a conveying face is punched out into a fan shape with a Thompson blade. The sheet S punched in a fan shape has end portions to be joined together. Each of the end portions is formed in a fingers-like shape extending from the inner peripheral end up to near the outer peripheral end, and each of the fingers has a narrow tip angle (an angle α1 between a cut line L1 of the finger and a tangent L to the belt peripheral direction line is small). The part from the portion held by the driving roller 41 and the pinch roller 42a and the vicinity thereof up to the outer peripheral end is formed with a single cut line L2 having a large angle α2 with respect to the tangent L to the belt peripheral direction line. Furthermore, as shown in FIGS. 6 and 8, a number of through holes h1 and h2 for attaching a number of bead composing elements 2b are provided near the outer peripheral end of the belt body 2a of the sheet S.

The canvas and the surface material of the sheet to form the belt body 2a are not limited to the above. And the cut line L2 may be curved.

(2) The end portions of the sheet S to be joined together are meshed with each other as shown in FIG. 7. And a urethane sheet is applied on the thermoplastic polyurethane joined with fingers and heat and pressure are applied thereon. In consequence, urethane of the urethane sheet is melted to infiltrate into gaps present between the joining edges, so that the end s of the sheet S are joined together.

Figure 8:
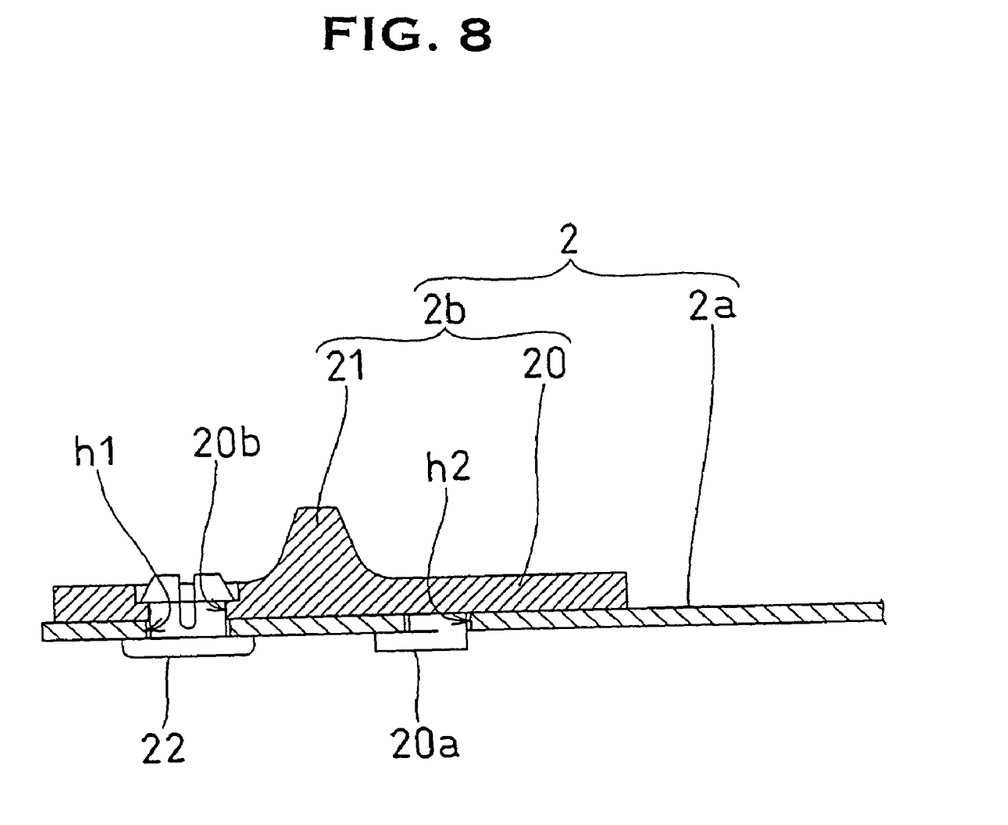
FIG. 8 is a sectional view showing a state in which a bead composing element is attached on the belt body.

The bead composing element 2b, illustrated in FIG. 8, includes a rectangular plate portion 20 and a thick portion 21 (or a projecting portion) provided on a longitudinal center portion of the plate portion 20 which has a substantially trapezoidal shape in a side view, and the portions 20 and 21 are integrally formed with synthetic resin or sintered metal. The plate portion 20 has an engaging part 20a at one side and an engaging hole 20b at the other side. When the bead composing element 2b is attached on the belt body 2a, the engaging part 20a is fit into the through-hole h2, while a pin 22 is fit into the through-hole h1 and the engaging hole 20b, so that the bead composing element 2b is fixed with the belt body 2a. Here, in the bead composing element 2b, for example, the plate portion 20 may have an 8.5 mm width in the belt forwarding direction in the outer peripheral edge side of the belt, an 8 mm width in the belt forwarding direction in the inner peripheral edge side thereof, and a length of 30 mm. Furthermore, the thick portion 21 may have a height of 4 mm and the side face thereof has a 70° inclination angle.

Figure 9:
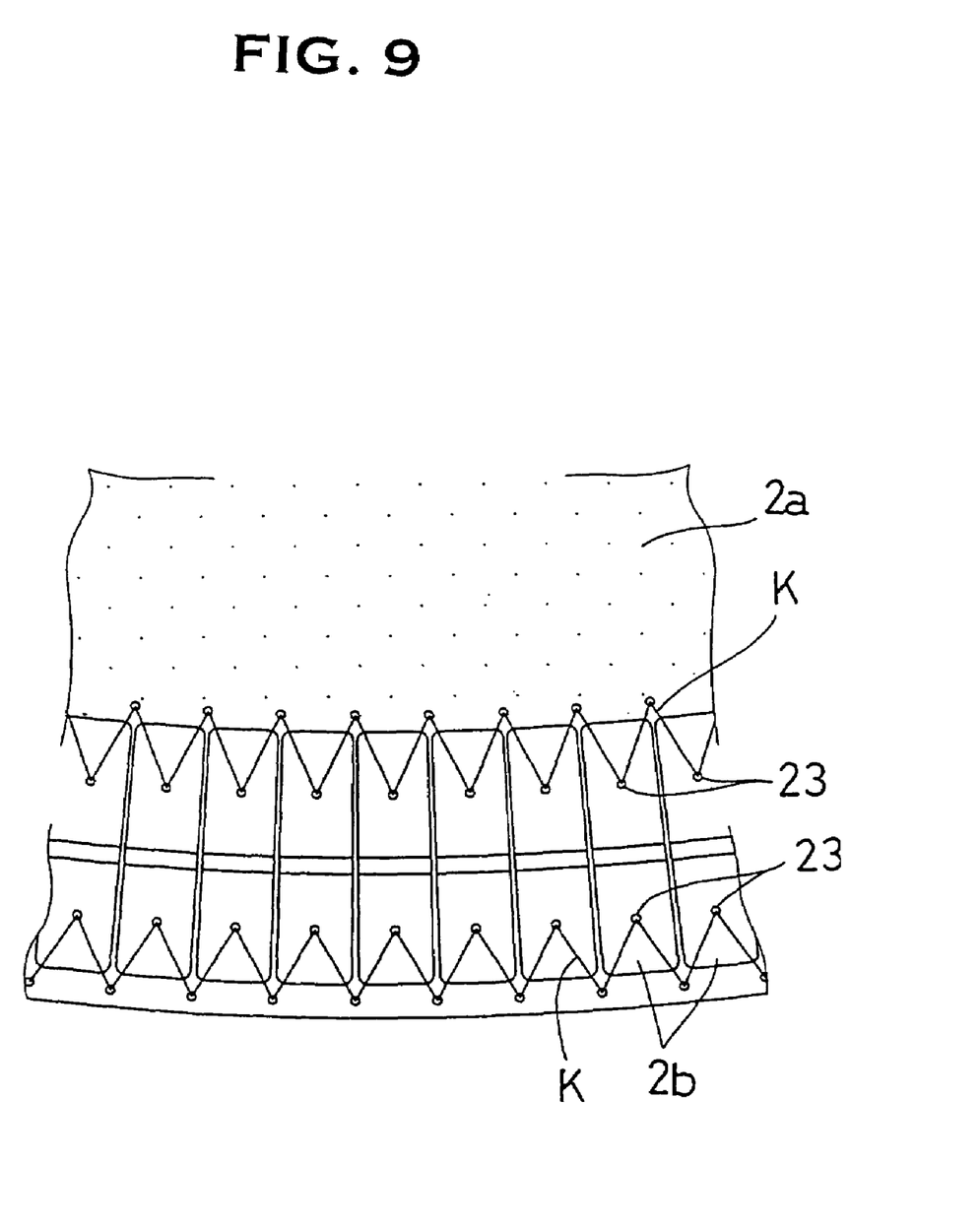
FIG. 9 is a sectional view showing another method for attaching bead composing elements on the belt body.
Figure 10:
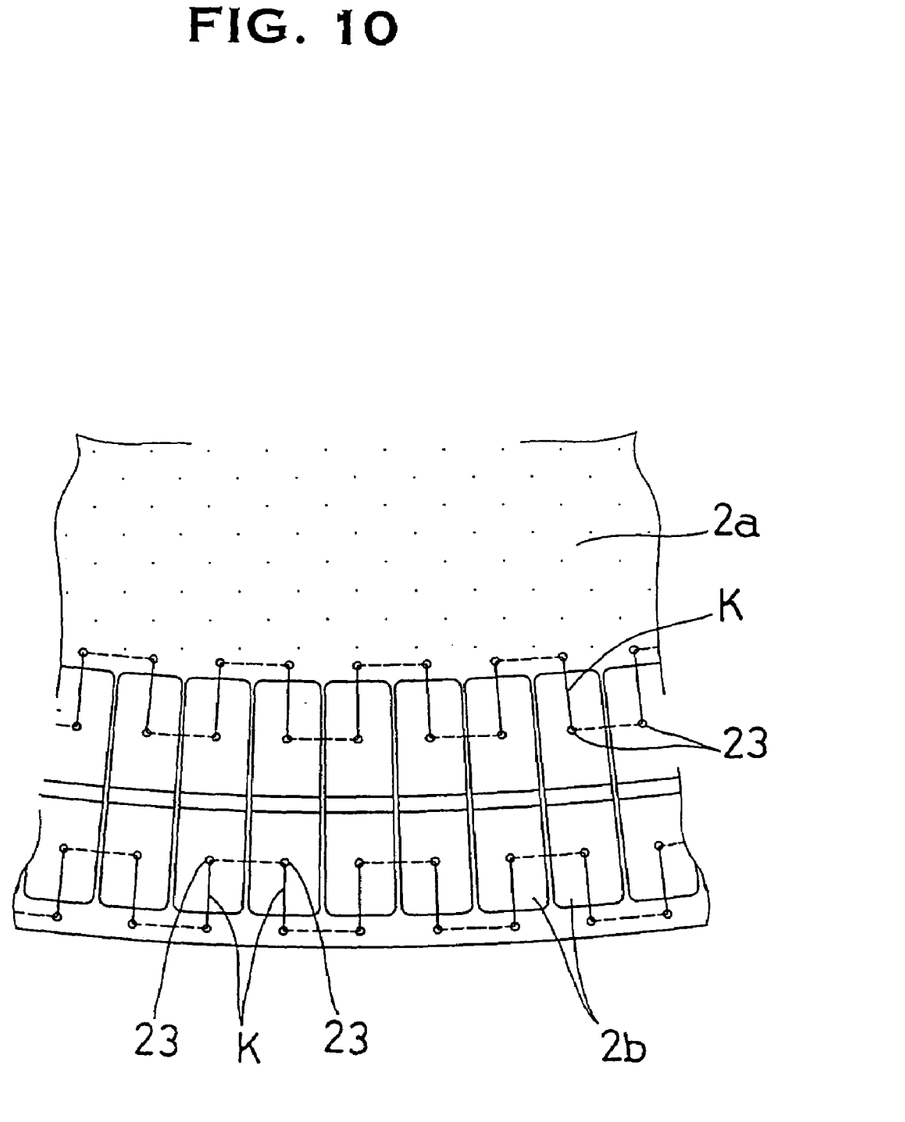
FIG. 10 is a sectional view showing another method for attaching bead composing elements on the belt body.
Figure 11:
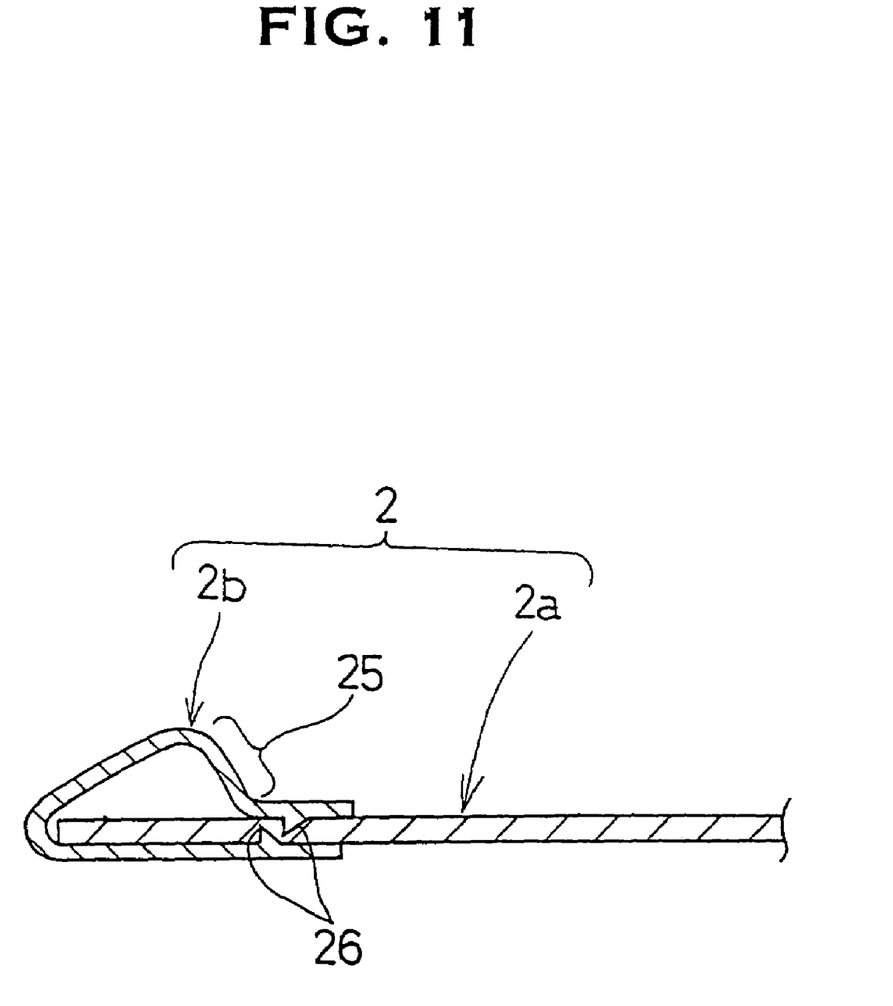
FIG. 11 is a sectional view showing another method for attaching another bead composing element on the belt body.

The way of attaching the bead composing element 2b to the belt main body 2a is not limitative to the above. As shown in FIGS. 9 and 10, the bead composing element 2b may be attached thereto with a thread K through a hole 23 formed on the bead composing element 2b. Furthermore, a pressed plate structure as shown in FIG. 11 may be used as the bead composing element 2b. In this bead composing element 2b, a steel plate is bent to make a slant surface 25 which is in contact with the guide members 30, 31 and 31. This pressed plate structure is attached to the belt main body 2a with claws 26 that bite down the belt body 2a.

The bead composing element 2b may be applicable if the width in the belt forwarding direction is as approximately 20 to 60% narrow as the diameter of a straight end roller which has a small diameter.

Figure 12:
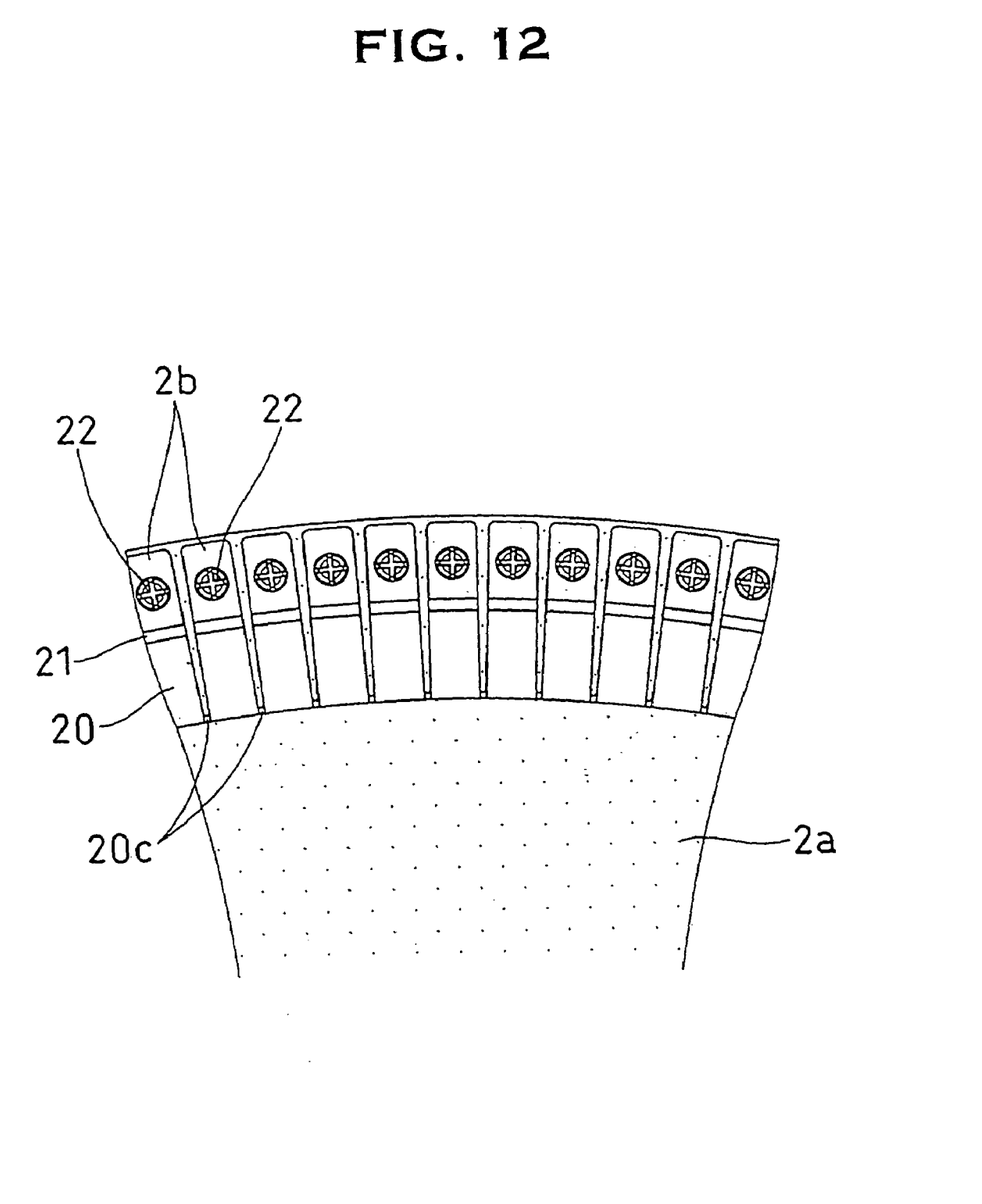
FIG. 12 is a plane view of bead composing elements of another embodiment.

The adjacent bead composing elements 2b and 2b may be joined together through an elastic bendable thin piece 20c (integrally formed), as shown in FIG. 12.

Then, the bead composing element 2b may be either detachable from the belt body 2a as described above or fixed thereto.

The shift prevention member 3, as illustrated in FIGS. 1 and 3, includes an upper side guide member 30, lower side guide members 31 and 31, a press member 32 and a screw 33. The press member presses the upper side guide member 30 and the lower side guide members 31 and 31 against the slant surface of the thick portion 21 of the bead composing element 2b. The screw 33 is manually used for fixing the press member 32 with the upper side of the belt mounting plate 14 and the lower side of the belt guide plates 16 and 16.

Figure 5:
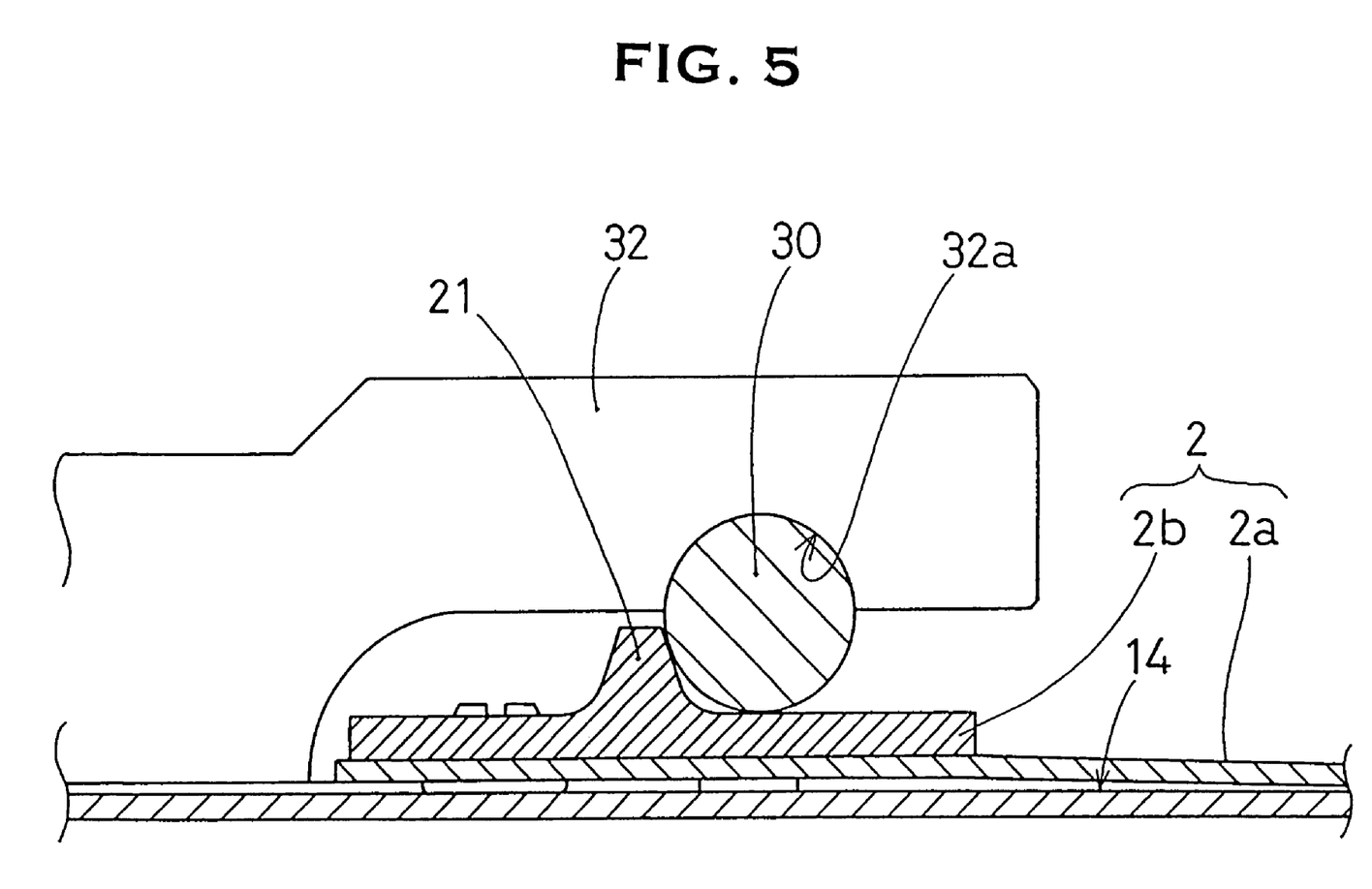
FIG. 5 is a sectional view showing a relation between a bead composing element and a shift prevention member employed in the curved conveyor.

The upper side guide member 30, shown in FIGS. 1 and 5, is provided on the upper side of the belt mounting plate 14 to prevent the inward shift of the belt. The upper side guide member 30 is formed of a round bar having shortly tapered ends at the both ends, and shaped in an arc with a curvature radius to contact with the inner side slant face of the thick portion 21.

The lower side guide members 31 and 31, as shown in FIG. 3, is located on the under side of the belt guide plate 16 to prevent the inward shift of the belt. The lower side guide members 31 and 31 are made of round bars with shortly tapered ends and formed in an arc shape with a curvature radius to contact with the inner side slant face of the thick portion 21. The guide member, here, is divided in two 31 and 31, because the driving roller 41 and the pinch roller 42a are present there, as shown in FIG. 3.

The material of the upper and lower guide members 30, 31 and 31 is determined depending on the material of the bead composing element 2b. One of them is synthetic resin, then the other must be metal. On the other hand, if one of them is sintered metal, the other may be metal.

The press member 32 is, as illustrated in FIG. 5, provided with a groove 32a with an arc section. FIG. 5 shows only the upper side guide member 30 and other parts therearound, however, the lower side guide members 31 and 31 and other parts therearound also have the same structure. The upper side of the upper guide member 30 and the lower sides of the lower guide members 31 and 31 are respectively received within the grooves 32a so that the guide members 30, 31 and 31 are positioned to stay therein in contact with the inner slant face of the thick portions 21.

The screw 33 is formed with a male screw fixed with a manually rotatable portion of a large diameter on one end.

The upper side and the lower side guide members 30, 31 and 31 may be easily removed from the conveyor belt 2 with bead only by grabbing and rotating the manually rotatable portion of the screw 33, without using a tool.

The driving member 4, as shown in FIGS. 1 to 3, includes a motor 40 with a decelerator, the driving roller 41, the pinch roller unit 42 and a controller (not shown). The motor 40 is bolted together to the mounting plate 10 of the motor supporting member 1a. The driving roller 41 is attached on the output shaft of the motor 40 with the decelerator. The pinch roller unit 42 is attached on the unit mounting plate 13. The controller is to change the rotation of the output shaft of the motor 40 with the decelerator by changing the frequency.

The pinch roller unit 42, as shown in FIGS. 2 and 4, holds the beaded conveyor belt 2 between the pinch roller 42a and the driving roller 41 to reliably rotate and drive the conveyor belt 2 by the friction engagement. This pinch roller unit 42 is constituted so as to adjust the force for holding the beaded conveyor belt 2 between the pinch roller 42a and the driving roller 41. Separation of the pinch roller 42a from the driving roller 41 allows to release the holding engagement of the conveyor belt 2.

The motor 41 with the decelerator, the driving roller 41 and the controller are already known, and will not be described here in detail.

The cover 5 includes, as shown in FIGS. 1 and 2, an inner peripheral side cover 5a and an outer peripheral side cover 5b.

The inner peripheral side cover 5a, as shown in FIG. 1, is formed in a fan shape so as to cover the inner peripheral edge area of the beaded conveyor belt 2 and the vicinity thereof. The cover 5a is screwed together to an upper portion 61a of the leg member 61 through a manually rotatble cover attaching screw 50 as shown in FIG. 2.

The outer peripheral side cover 5b, as shown in FIG. 1, is shaped so as to cover the outer periphery edge area of the beaded conveyor belt 2 and the vicinity thereof, i.e., formed in a shape to cover the bead composing elements 21, the upper guide member 30, the press member 32, the screw 33, the motor 40 with the decelerator, the controller and the like. The cover 5b is attached to the vertical part 14b of the belt mounting plate 14 through a manually rotatable cover attaching screw 50.

The leg member 6, as shown in FIGS. 2 and 3, includes a leg portion 60 in an up-side-down T-shape formed by fixing a pillar 60a to the center of a horizontal beams 60b, a leg portion 61 of one pillar, a horizontal beam 62 connecting the leg portion 61 and the pillar 60a, and foot portions 63, 63 and 63 with height adjustable screws attached on the both ends of the horizontal beam 60b and the bottom portion of the leg portion 61. The outer side portion of the belt having the motor 40 with the decelerator and the like is supported by the leg portion 60, while the inner side portion of the belt on the belt mounting plate 14 is supported by the leg portion 61.

In this embodiment, when the cover attaching screw 50 is removed, the upper portion 61a of the leg portion 61 can be rotated with a hinge T.

As shown in FIG. 4, the conveyor belt 2 with bead is stretched between the end rollers 15 and 15 so as to maintain a certain rotation track by the belt mounting plate 14, the two belt guide plates 16 and 16, the driving roller 41 and the pinch roller 42a.

Furthermore, as described above, the conveyor belt 2 is stretched between the end rollers 15 and 15, and, in this state shown in FIGS. 1, 3 and 5, the inner slant faces of the thick portions of a number of bead composing elements 2b (function as a bead member) on the belt 2 are in contact with the upper and lower guide members 30, 31 and 31.

Therefore, when the motor 40 with the decelerator is driven to rotate, the curved conveyor belt 2 rotates as being caught and held between the driving roller 41 and the pinch roller 42a. And the bead composing elements 2b forward sliding on the upper and lower side guide members 30, 31 and 31 in the above mentioned contact state therewith. Consequently, the conveyor belt 2 is prevented from inward shifting. Namely, the bead member composed of a number of bead composing elements 2b exhibits the same function as a conventional continuously formed bead.

The conveyor belt 2 with bead may be removed from the conveyor main body 1 with the following steps (1) to (5).

(1) Release the manually operable screw 50 for mounting the cover, and remove the inner peripheral side cover 5a and the outer peripheral side cover 5b

(2) Rotate the upper portion 61a of the leg member 61 with the hinge from a position shown by continuous line to another position shown by two-dot chain line in FIG. 2

(3) Loose the manually rotatable screw 33 to remove the upper and lower guide members 30, 31 and 31 received within the groove 32a from the press member 32

(4) Separate the pinch roller 42 away from the driving roller 41 to release the conveyor belt 2 being held therebetween (5) After the above steps (1) to (4), shift the beaded conveyor belt 2 from the outer peripheral side toward the inner peripheral side so that the beaded conveyor belt 2 may be removed from the conveyor main body 1

(6) When attaching the beaded conveyor belt 2 on the conveyor main body 1, take the above steps reversely As stated above, in the constitution of this conveyor belt 2 with bead; (1) the bead are composed of a number of bead composing elements disposed on across the entire outer peripheral area of the belt main body 2a, (2) the width in the belt forwarding direction of each bead composing element 2b is as narrow as about 20 to 60% of the diameter of the straight end roller 15 having a small diameter, and (3) the adjacent bead composing elements 2b and 2b are separated from each other, or are connected with a thin piece 20c. Therefore, compared with the beaded conveyor belt stated in the prior art section, in this beaded conveyor belt 2, extremely less crack or breakage may occur in the bead composing elements 2b, and thereby the belt 2 will withstand the use for a long time period.

Alternatively, for example, in case bead composing elements 2b are pinned or sewed together with the belt body 2a, when one or some of the bead composing elements 2b are damaged, the one or some of them may be easily replaced. That is, if one or some of the bead composing elements 2b are damaged, the conveyor belt may be continuously used only by replacing the damaged bead composing elements 2b.

The joint portion (i.e. an end portion of the fan-shaped sheet S) is formed by one time press cut with a Thompson blade, and this allows to decrease a number of manufacturing steps and lower manufacturing cost.

Furthermore, the belt body 2a has a finger joint from the inner peripheral end to near the outer peripheral end, and a single line joint for the other area from the portion to be held between the driving roller 41 and the pinch roller 42a and the vicinity thereof up to the outer peripheral end, the latter joint being made by connecting cut lines L2 each of which has a large angle α2 with respect to the tangent L on the peripheral direction line of the belt. Therefore, twisting load due to the change in the peripheral speed by the driving roller 41, the belt body 2a and the pinch roller 42a and inwardly shifting force of the belt body 2a may be prevented by the shift prevention member 3. And, as a result, even if tensile force in a width direction of the belt body 2a, peeling and breakage hardly occurs at a portion indicated with the numeral 27 of the belt body 2a.

The end portions of the fan-shaped sheet S are practically joined together with a finger joint, and the joined portion will not become thicker like those in the skiving joint or the step joint.

The end roller 15, as shown in FIG. 1, is formed with the pivot shaft 15a and a plurality of resin short rollers 15b rotatably inserted thereon. And the bearing 15c (which has the same diameter as or a little larger diameter than the outer diameter of the short resin roller 15b) is provided between the adjacent short rollers 15b and 15b located in the belt outer peripheral side. Therefore, in the outer peripheral area of the belt where the peripheral speed of the belt body 2a is rather large, the belt body 2a forwards along with the rotation of the outer lace of the bearings 15c, while in the inner peripheral area of the belt where the peripheral speed of the belt body 2a is small, the belt body 2a forwards along with the rotation of the short rollers 15b. Therefore, in the outer peripheral area with a larger peripheral speed, harsh squeaking frictional noises may be extremely suppressed (or eliminated) as compared with the case using end rollers having no bearings 15c.

In order that the short roller 15b may rotate with respect to the pivot shaft 15a, a small gap is naturally provided therebetween. Therefore, in a direction where a tension force of the belt applies, the level of the outer peripheral position of the short roller 15b becomes lower than that of the outer peripheral position of the bearing 15C. As a result, the conveyor belt contacts with the bearing 15c and harsh squeaking frictional noises are efficiently prevented.

The thick portion 21 of the bead composing element 2b is shaped in a trapezoid in a side view. The shape is not limitative thereto, but may be rectangular, square, triangle or the like.

Having the construction stated above, the present invention may provide a curved conveyor in which frictional noises from the end roller during rotation of the conveyor belt are suppressed.

What is claimed is:

1. A curved conveyor comprising:
  a conveyor body;
  two end rollers disposed at a certain angle;
  a conveyor belt stretched between the two end rollers, each of the end rollers being provided with an pivot shaft;
  a plurality of short rollers rotatably mounted on the pivot shaft; and
  a bearing having an outer lace is interposed between at least the adjacent short rollers located near an outer peripheral side of the belt, and an outer diameter of the outer lace of the bearing is greater than the outer diameter of the short roller.

2. The curved conveyor according to claim 1, wherein a small gap is provided between the pivot shaft and the short rollers.

3. The curved conveyor according to claim 1, wherein the pivot shaft is made of steel and the short rollers are of resin.

4. The curved conveyor according to claim 1, wherein the pivot shaft is attached to the conveyor body.

5. The curved conveyor according to claim 3, wherein the pivot shaft is attached to the conveyor body.

6. The curved conveyor according to claim 2, wherein the pivot shaft is made of steel and the short rollers are of resin.

7. The curved conveyor according to claim 2, wherein the pivot shaft is attached to the conveyor body.

8. The curved conveyor according to claim 6, wherein the pivot shaft is attached to the conveyor body.

* * * * *